United States Patent [19]

Durisin

[11] Patent Number: 4,537,168
[45] Date of Patent: Aug. 27, 1985

[54] ENGINE COMPONENT POSITION INDICATING SYSTEM

[75] Inventor: Bretislav Durisin, Wooster, Ohio
[73] Assignee: Eaton Corporation, Cleveland, Ohio
[21] Appl. No.: 616,634
[22] Filed: Jun. 4, 1984
[51] Int. Cl.$^3$ ............................................ G01M 13/00
[52] U.S. Cl. ............................... 123/198 R; 73/118; 74/513
[58] Field of Search ............... 123/319, 376, 400, 403, 123/198 R; 74/513; 340/870.38; 73/116, 118, 119 R

[56] References Cited

U.S. PATENT DOCUMENTS

| | | | |
|---|---|---|---|
| 2,979,704 | 4/1961 | Bickford | 340/870.38 |
| 3,188,878 | 6/1965 | Chelminski et al. | 74/513 |
| 4,185,517 | 1/1980 | Gill et al. | 74/513 |
| 4,351,198 | 9/1982 | Hansen | 74/513 |
| 4,392,375 | 7/1983 | Eguchi et al. | 340/870.38 |

Primary Examiner—William A. Cuchlinski, Jr.
Attorney, Agent, or Firm—C. H. Grace; A. E. Chrow

[57] ABSTRACT

Disclosed is an Engine Component Position Indicating System (60) operated by hand or foot pedal (26) that is able to provide a signal from a signal generating means (52) to a visual indicating means (58) in response to rotation of a shaft (2) in either direction that is operatively coupled at one to the signal generating means (52). Shaft (2) is connected to pedal (26) by connecting means preferably in the form of rod (16) which has one end connected to input member (8) secured to shaft (2) and which causes shaft (2) to rotate in opposite directions according to whether pedal (26) is pressed or released by the operator's foot. Shaft (2) is also provided with output member (10) which is secured to shaft (2) and which is operatively connected to a linking means such as flexible cable (32) which causes an engine component such as carburetor throttle or choke or an automatic transmission modulator valve to move with the operator being provided with a continuous visual indication of the components's respective position at any given time.

11 Claims, 3 Drawing Figures

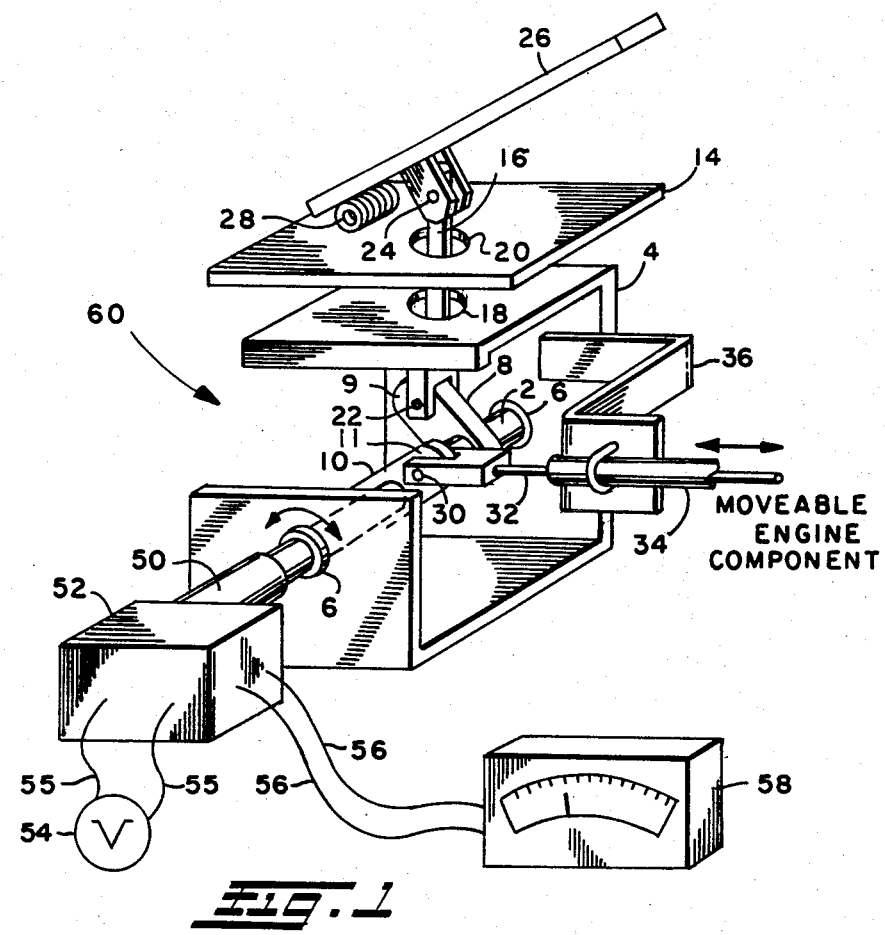
Fig. 1
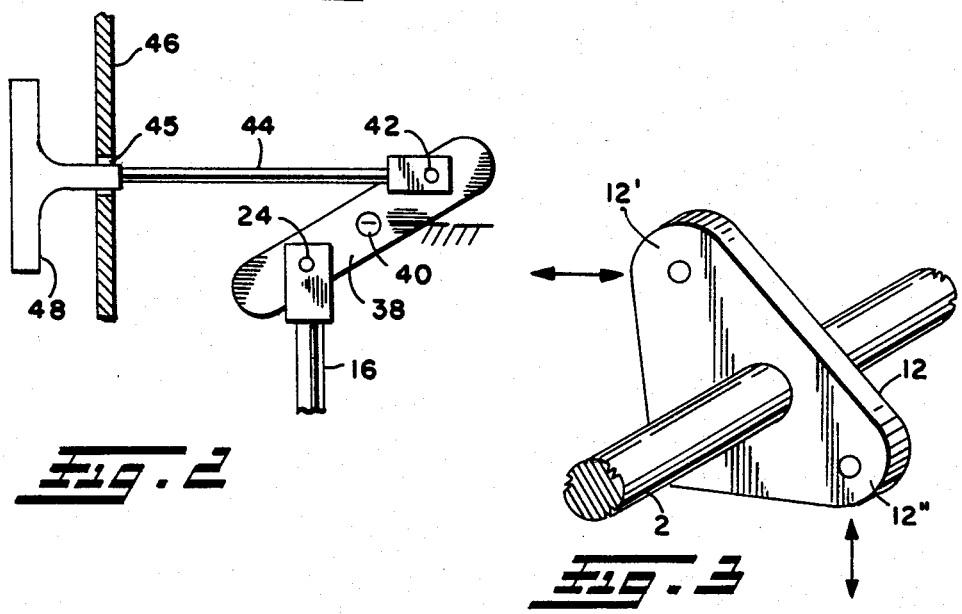
Fig. 2
Fig. 3

ENGINE COMPONENT POSITION INDICATING SYSTEM

INTRODUCTION

This invention relates generally to a system for indicating the position of a moveable engine component such as a carburetor throttle or choke or an automatic transmission modulator valve and more particularly to a system that utilizes an operator controlled rotatable shaft having at least one end operatively coupled to a signal generating means that is adapted to provide a position signal to an indicator in response to rotation of the shaft to provide a visual indication of the particular position of the moveable engine component being monitored.

BACKGROUND OF THE INVENTION

A variety of operator or automatic control devices have been used for many years to control the position of certain moveable engine components such as a carburetor's throttle and choke and the modulator valve of an automatic transmission.

Although the carburetor throttle position is most commonly controlled by an accelerator pedal actuated by a foot of the operator, there are instances where the throttle position may be remotely controlled by hand movement of some type of hand lever connected to the throttle.

Although it is present practice to employ sophisticated control systems to position a carburetor choke that employ a variety of sensed engine conditions such as coolant temperature, air temperature, atmospheric pressure and other conditions, the position of the choke may, if desired, be controlled directly by the operator moving a hand operated lever.

Many of the accelerator pedal operated prior-art devices for controlling the position of a carburetor throttle employ a shaft such as disclosed for example in U.S. Pat. No. 4,185,517, the disclosure of which is incorporated herein by reference. Such devices, however, have generally featured a non-rotating shaft and none have utilized a rotating shaft as a means of providing a visual indication of the position of the throttle.

The particular position of moveable engine components such as the carburetor throttle and choke and the modulator valve of an engine automatic transmission provides the operator with useful and informative information heretofor unavailable that can provide a forewarning of changes occuring in the engine system relative to wear or slippage or other factors.

SUMMARY OF THE INVENTION

Accordingly, it is an object of this invention to provide a system employing a rotatable shaft for providing a visual indication of moveable engine components.

It is another object of this invention to provide an operator pedal or hand controlled system employing a rotatable shaft that is able to provide visual indication of the position of moveable engine components such as a carburetor throttle or choke or modulator valve of an engine automotive transmission as a function of the rotational position of the shaft.

BRIEF DESCRIPTION OF THE FIGURES

FIG. 1 shows a perspective view of an embodiment of the moveable engine component position indicating system of the invention;

FIG. 2 shows a partial side elevation schematic view of an alternate way of moving certain parts of the embodiment of FIG. 1; and FIG. 3 shows a partial perspective view of an alternate embodiment of two parts used in the embodiment of FIG. 1.

DESCRIPTION OF SOME PREFERRED EMBODIMENTS

FIG. 1 shows an embodiment 60 of a moveable engine component position indicating system of the invention. System 60 includes an elongate rotatable shaft 2 having a central rotational axis (not referenced) extending between opposite ends (not referenced) of shaft 2. Shaft 2 is rotatably mounted on frame 4 by suitable bearings 6 or other means that would enable shaft 2 to rotate in opposite directions about its central rotational axis. Frame 4 is secured against movement with respect to the moveable engine component being controlled by system 60. Input means in the form of member 8 is fixedly secured to shaft 2 and has an outlying portion 9 that is disposed radially outwardly from shaft 2 so that movement of the outlying portion 9 of member 8 in opposite directions causes shaft 2 to rotate in opposite directions. Output means in the form of member 10 is spaced-apart along shaft 2 from member 8 and is likewise fixedly secured to shaft 2 and has an outlying portion 11 disposed radially outwardly from shaft 2 that is caused to move in opposite directions in response to rotation of shaft 2 in opposite directions. The input and output means secured to shaft 2 may have any suitable shape that enables movement of the input means in opposite directions to cause shaft 2 to rotate in opposite directions which in turn causes the output means to move in opposite directions in the manner and amount desired. The input and output means may also be merged into a single member fixedly secured to shaft 2 such as member 12 shown in FIG. 3. As can be seen by the arrows, movement of the portion of member 12 at 12' in opposite directions causes shaft 2 to rotate in opposite directions which in turn causes the portion of member 12 at 12" to move in opposite directions. Portions 12' and 12" are spacially related with respect to each other and with shaft 2 so that movement at 12' produces the amount of movement at 12" desired.

Preferably, a plate 14 is disposed above frame 4 in the manner shown in FIG. 1 so that frame 4 can be secured to the bottom of the vehicle floor board whose moveable engine component is or are being controlled by system 60. Plate 14 is on the operator's side of the floor board with plate 14 and frame 4 secured together by suitable means with the floor board pressed between.

Connecting means in the form of rod 16 extends through opening 18 in frame 4 and an opening in the floor board (not shown) and through opening 20 in plate 14 as shown in FIG. 1. Rod 26 is able to move in opposite directions through the openings and has one end pivotably mounted at 22 to portion 9 of member 8 and is pivotably mounted at its opposite end at 24 to pedal 26.

Pedal 26 is pivotably mounted by suitable means in conjunction with torsion spring 28 to the side of plate 14 facing away from frame 2. Spring 28 provides a biasing means for urging pedal 26 upwards to some predetermined position above plate 14 at which pedal 26 is not being depressed downwardly by the foot of the operator. Although not shown in FIG. 1, rod 16 may be threadingly coupled at either or both of its ends to pivotal mountings 22 and 24 for adjusting the elevation of pedal 26 above plate 14 if such is desired.

The use of torsion spring 28 in connection with the pivotal mounting of pedal 26 to plate 14 is but one of the ways in which to urge the various components into an initial position when not being controlled by the operator. For example, a spring could be connected to the component being controlled or between input means 8 or output means 10 and frame 4 in such a manner as to urge pedal 26 and the rest of the components of system 60 being moved by the operator into an initial position when not being controlled by the operator including an initial rotational position of shaft 2. Alternatively, shaft 2 could be mounted to frame 4 by means of a torsion spring suitably adjusted so that shaft 2 automatically rotates to a pre-selected initial position whenever the operator releases his or her foot from the pedal.

A pivotable coupling is mounted at 30 to portion 11 of output member 10 and connects member 10 to a linking means for linking member 10 to the component being controlled by system 60. The linking means is preferably in the form of a flexible cable 32 having one end connected to member 10 and an opposite end connected to the component whose movement is being controlled as shown in FIG. 1. Cable 32 is preferably slidably disposed within an outer casing 34 which is secured by suitable means against movement with respect to the component whose movement is being controlled. Although described herein in a form having only one linking member, it is to be understood that the system of the invention includes versions having a plurality of output members respectively operatively linked to separate engine components or more than one linking member operatively connected to a single output member to enable the system of the invention to monitor the position of more than one component at the same time.

For purposes of definition, the term "operator controlled means", as used herein, means the means by which the operator is able to move input means 8 in opposite directions to cause shaft 2 to rotate in opposite directions which in turn causes output means 10 to move in opposite directions which in turn causes the linking means to move in opposite directions to position the component whose position is being controlled in the manner desired. In FIG. 1 the operator controlled means comprises pedal 26 and rod 16 and the associated hardware enabling them to be coupled to input member 8 in the manner necessary to enable pivotal movement of pedal 26 to move member 8 in opposite directions the amount desired.

An alternate hand operator controlled means for positioning a moveable engine component by means of system 60 is shown in FIG. 2. In FIG. 2, rod 16 is connected at one end to input member 8 as previously described with respect to FIG. 1. The opposite end of rod 16 is pivotably mounted at 24 to one end of arm 38 which is pivotably mounted at 40 to a frame that is restricted against movement with respect to the component whose position is being controlled. Connecting member 44 is pivotably secured at one end at 42 to the opposite end of member 35. Member 44 may be a flexible cable such as previously described with respect to the linking means of system 60 where such is desired. The opposite end of member 44 extends through an opening 45 in panel 46, which may be the dashboard panel of a vehicle using the control systems of the invention, and is secured to handle 48. As can be seen in FIG. 2, movement of handle 48 by the operator in opposite directions, towards the viewer's right and left, causes member 38 to rotate in opposite directions about 40 which in turn causes rod 16 to move upwards and downwards as viewed in FIG. 2 which in turn causes member 8 to move and rotate shaft 2 in opposite directions as previously described.

Such arrangement of parts as hereinbefore described for positioning an engine component by hand or pedal are well known in the art. Such devices, however, have been unable to provide the operator with a visual indication of the position of the engine component at any given time. In order to eliminate this deficiency, the system of the invention utilizes the rotation of shaft 2 as a driving mechanism for driving a suitable signal generator which in turn provides a position signal to an indicator which can be viewed by the operator. The position signal is a function of the rotational position of the shaft from some predetermined initial rotational position.

To provide a visual indication of the position at which the component being controlled is at any given time, at least one end of shaft 2 is operatively coupled to a signal generating means in such a manner that rotation of shaft 2 in opposite directions can be translated into a position signal that is indicative of the position of the component with respect to the rotational position of shaft 2 from an initial rotational position. Although the signal generating means may be of any suitable mechanical and/or fluid pressure or vacuum type which is able to provide a mechanical or fluid position signal to a suitable indicator, the signal generating means is preferably an electrical signal generating means such as potentiometer 52 which is coupled by coupling 50 or other suitable means to at least one end of shaft 2 and which is driven in opposite directions in response to rotation of shaft 2 in opposite directions. It is to be understood, that the end of shaft 2 may be coupled to the signal generating means in any suitable manner including a coupling such as coupling 50 and pins and flexible connections and by non-mechanical linkages such as magnetic coupling devices where such is desired.

Potentiometer 52 is provided with a suitable source potential V (54) by insulated conductors 55 as shown in FIG. 1. Suitable calibration means, as is well known by those skilled in the art, is provided so that the driving of potentiometer 52 in opposite directions by shaft 2 provides a position signal potential that is proportional to source potential V which is delivered to indicator 58 by insulated conductors 56 to provide a visual indication of the position of the component whose position is being controlled as a function of the proportionated potential being caused by the rotation of the shaft.

The invention thus utilizes the rotation of a shaft being rotated in opposite directions by the operator to generate a position signal which in turn is received by an indicator that is able to provide an indication of the position of component whose position is being controlled in response to the position signal being received and thus provides the operator with useful information with respect to the actual position of the engine component at any given time that was heretofor unavailable.

What is claimed is:

1. A moveable engine component position indicating system comprising;
   a frame secured against movement with respect to the engine component,
   an elongate shaft rotatably mounted on the frame in such a manner as to be able to rotate in opposite directions about a central rotational axis extending between opposite ends thereof,
   input means operatively secured to the shaft and functional to rotate the shaft in opposite directions about the central rotational axis thereof in response to movement of the input means in opposite directions,
   output means operatively secured to the shaft and functional to move in opposite directions in response to the rotation of the shaft in opposite directions,
   linking means operatively connected at one end to the output means and at an opposite end to the engine component and functional to move the component in opposite directions in response to movement of the output means in opposite directions,
   operator controlled means operative to enable an operator to move the input means in opposite directions and cause the input means to rotate the shaft in opposite directions and cause the shaft to move the output means in opposite directions and cause the output means to cause the linking means to move the engine component in opposite directions to a desired position,
   indicator means, operative to visually indicate the position of the engine component in response to receipt of a position signal indicative of the rotational position of the shaft with respect to a predetermined initial rotational position, and
   signal generating means operatively coupled to at least one end of the shaft and functional to provide the position signal to the indicator means in response to the rotation of the shaft.

2. The system of claim 1 wherein the component is a carburetor throttle.

3. The system of claim 1 wherein the component is a carburetor choke.

4. The system of claim 1 wherein the component is an engine automatic transmission modulator valve.

5. The system of claim 1 wherein the operator controlled means for moving the input means in opposite directions comprises a pedal pivotly mounted at one end to a frame that is secured against movement with respect to the engine component, connecting means having one end connected to the output means and an opposite end connected to the pedal, and biasing means urging the shaft into the initial rotational position whenever the output means is not being controlled by the operator, said pedal, the connecting means and biasing means functionally interrelated such that depression of the pedal by the operator causes the connecting means to cause the input means to rotate the shaft in one direction from the initial base rotational position and release of the pedal by the operator enables the biasing means to urge the shaft back to the initial rotational position which in turn causes the input means, connecting means and pedal to return to their respective initial positions.

6. The system of claim 1 wherein the operator controlled means is a hand lever that is operatively connected to the input means and functional to enable the operator to move the input means in opposite directions by movement of the lever in opposite directions by the operator.

7. The system of claim 1 wherein the input means and output means respectively comprise input and output arms respectively fixedly secured to the shaft having respective outlying portions thereof disposed radially outwardly therefrom, said input arm adapted such that movement of the outlying portion thereof in opposite directions causes the shaft to rotate in opposite directions which in turn causes the outlying portion of the output arm to move in opposite directions.

8. The system of claim 1 wherein the input means and the output means comprise a single member fixedly secured to the shaft having an input portion and an output portion respectively disposed radially outwardly from the shaft and spatially related to each other and to the shaft such that movement of the input portion an amount desired in opposite directions cause the shaft to rotate in opposite directions the amount desired which in turn causes the output portion to move in opposite directions the amount desired.

9. The system of claim 8 wherein the flexible cable is slidingly disposed within an outer casing that is secured against movement with respect to the engine component.

10. The system of claim 1 wherein the linking means comprises a flexible cable having one end secured to the output means and an opposite end to the engine component.

11. The system of claim 1 wherein the signal generating means comprises a potentiometer that is provided with a suitable electrical source potential and is operatively driven by the shaft end to provide the position signal to the indicator means in the form of an electrical signal that is proportional to the source potential.

* * * * *